United States Patent
Batra et al.

(10) Patent No.: US 6,985,532 B2
(45) Date of Patent: Jan. 10, 2006

(54) ULTRA WIDEBAND (UWB) TRANSMITTER ARCHITECTURE

(75) Inventors: Anuj Batra, Dallas, TX (US); Anand G. Dabak, Plano, TX (US); Ranjit Gharpurey, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 180 days.

(21) Appl. No.: 10/335,717

(22) Filed: Jan. 2, 2003

(65) Prior Publication Data

US 2003/0227980 A1   Dec. 11, 2003

Related U.S. Application Data

(60) Provisional application No. 60/386,821, filed on Jun. 7, 2002.

(51) Int. Cl.
*H04B 14/06*   (2006.01)
(52) U.S. Cl. ........................ 375/245; 327/103
(58) Field of Classification Search ............... 375/295, 375/244, 243, 245, 242, 138, 238, 239, 289, 375/141, 146; 341/152, 144; 327/103, 106, 327/164, 126, 100
See application file for complete search history.

(56) References Cited

U.S. PATENT DOCUMENTS

| | | | | |
|---|---|---|---|---|
| 5,815,537 A | * | 9/1998 | Janssen | 375/350 |
| 2003/0048212 A1 | * | 3/2003 | Libove et al. | 341/144 |
| 2003/0161411 A1 | | 8/2003 | McCorkie et al. | |
| 2004/0109506 A1 | | 6/2004 | Hinton et al. | |
| 2004/0136438 A1 | * | 7/2004 | Fullerton et al. | 375/130 |

* cited by examiner

*Primary Examiner*—Jean B. Corrielus
(74) *Attorney, Agent, or Firm*—J. Dennis Moore; W. James Brady, III; Frederick J. Telecky, Jr.

(57) ABSTRACT

System and method for analog signal generation and manipulation in an ultra-wideband (UWB) transmitter. A preferred embodiment comprises a digital portion 305 of an UWB transmitter (for example, transmitter 300), which is responsible for encoding a data stream to be transmitted, and an analog portion 330. The analog portion 330 creates a stream of short duration pulses from the encoded data stream and then filters the stream of short duration pulses. To simplify the generation of the short duration pulses, a quantized representation of the short duration pulse is used. The quantized representation is created via the use of control signals that by coupling differential amplifiers together (such as amplifier 611), generate a voltage drop across a resistor (such as resistor 619) and hence, a current.

24 Claims, 6 Drawing Sheets

ULTRA WIDEBAND (UWB) TRANSMITTER
ARCHITECTURE

This application claims the benefit of U.S. Provisional Application No. 60/386,821, filed on Jun. 7, 2002, entitled "Ultra-Wideband (UWB) Receiver and Transmitter Architecture," which application is hereby incorporated herein by reference.

TECHNICAL FIELD

The present invention relates generally to a system and method for wireless digital communications systems, and more particularly to a system and method for providing a transmitter for a wireless communications system with a large data bandwidth.

BACKGROUND

Ultra-wideband (UWB) communications systems are normally defined as carrier-less communications systems wherein the bandwidth of the signal being transmitted, $f_B$, is greater than or equal to 0.20 $f_c$, where $f_c$ is the center frequency of the signal being transmitted. Additionally, the UWB communications system should have a minimum bandwidth of 500 MHz. Note that the definition for UWB communications systems and devices is as defined by the Federal Communications Commission (FCC) of the United States. UWB communications systems have been around for a great number of years, and the majority of them fall under one type of system, they modulate a stream of short-duration pulses (with an approximate duration which ranges from 0.2 nanoseconds (ns) to 2 ns), either in time (pulse position modulation (PPM)), amplitude (pulse amplitude modulation (PAM)), or phase angle (bi-phase modulation).

The generation of the short duration pulses is a task that is normally performed by the transmitter of the UWB communications system, usually once the data that is to be transmitted has been encoded, spread, scrambled, and otherwise ready for transmission. Typically, a pulse generator is used to generate a generic pulse of desired shape, magnitude, and duration. Then, the generic pulse is modulated using some modulation scheme, perhaps PPM, PAM, or bi-phase modulation, or some other modulation scheme, and modulated using the data that is to be transmitted.

The short duration pulses used in the UWB communications systems can be generated in several different ways, depending on the shape of the pulse. For example, if the pulse is a relatively simple square wave, a simple current source and a resistor can be used. The use of the current source and resistor combination is representative of a pulse generator that is an analog pulse generator. Alternatively, if the pulse is a more complex shape, then data points (samples) of the pulse may be stored in a memory and then provided to a digital-to-analog converter (DAC), which will produce the pulse. The storage of samples of the pulse and the use of the DAC is typical of a digital pulse generator.

One disadvantage of the prior art is that the use of a simple current source and resistor combination is not very flexible. Basically, the combination can be used to produce only one type of pulse. Therefore, if the need should arise that a different type of pulse is needed, differing in terms of shape, duration, magnitude, etc., then the combination may not be able to generate the different pulse.

A second disadvantage of the prior art is that the use of a memory to store the samples of the pulse to be generated can result in the need to store a large number of different sets of samples to generate different types of pulses at varying durations and magnitudes and polarities. This can result in the need to have a relatively large memory.

A third disadvantage of the prior art is that the use of stored samples to generate the pulses is the speed of the digital-to-analog converter, which may not be able to perform the conversion at a sufficiently fast rate.

SUMMARY OF THE INVENTION

These and other problems are generally solved or circumvented, and technical advantages are generally achieved, by preferred embodiments of the present invention which creates pulses of varying duration, magnitude, and type through the use of a number of control signals and current sources. By varying the duty cycles of the control signals, a large variety of pulses can be created, providing compatibility with a large variety of UWB modulation schemes.

In accordance with a preferred embodiment of the present invention, a method for generating quantized pulses comprising obtaining information describing the quantized pulses, turning on a first and a second current sources based on the information to produce a first and a second currents, summing the first and second currents, and creating a voltage drop based on the summed current.

In accordance with another preferred embodiment of the present invention, a quantized pulse generator comprising a plurality of differential amplifiers, each differential amplifier coupled at a first end to a power rail, the differential amplifier to produce a current, a plurality of switches, each switch coupled to a second end of one differential amplifier of the plurality of differential amplifiers, the switch to regulate the flow of the current produced by the differential amplifier, a resistor coupled to the second end of each of the differential amplifiers via the plurality of switches, the resistor to convert a current from each differential amplifier into a voltage drop when the switch is closed, an output coupled to the resistor, a control signal generator coupled to the plurality of switches, the control signal generator containing circuitry to generate a plurality of control signals, one control signal being coupled to each switch in the plurality of switches, wherein the control signals are used to open and close each switch, and a memory coupled to the control signal generator, the memory to store information regarding the plurality of control signals to be generated by the control signal generator.

In accordance with another preferred embodiment of the present invention, an ultra-wideband (UWB) transmitter comprising a data input, a digital signal processing block coupled to the data input, the digital signal processing block containing circuitry to encode and convert a digital data stream provided by the data input, an analog signal processing block coupled to the digital signal processing block, the analog signal processing block comprising a quantized pulse generator coupled to the digital signal processing block, the quantized pulse generator containing circuitry to generate a quantized pulse in accordance with the encoded and converted digital data stream, a filter coupled to the quantized pulse generator, the filter to ensure that the quantized pulses generated by the quantized pulse generator conform to a specified spectral mask and the UWB transmitter further comprising an antenna coupled to the analog signal processing block.

An advantage of a preferred embodiment of the present invention is the pulse generator can be configured to generate a pulse of varying duration, magnitude, and type, to meet changing needs and modulation schemes. The use of a flexible pulse generator allows a single pulse generator to be used in the place of a number of pulse generators, reducing the overall cost of the UWB transmitter.

A further advantage of a preferred embodiment of the present invention is through the use of a single flexible pulse generator in the place of a number of pulse generators also saves on the amount of space consumed in the implementation of the pulse generator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawing, in which.

DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an UWB transmitter. The invention may also be applied, however, to other applications where a flexible pulse generator is needed, such as other types of wired and wireless transmitters, signal generators, any application where a signal of a specifiable duration, magnitude, and type is required, etc.

Figure 1:
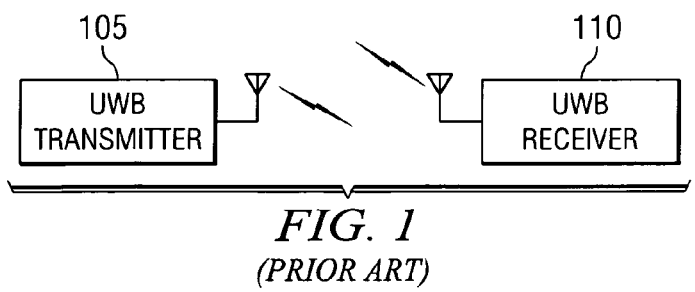
FIG. 1 is a block diagram showing an exemplary ultra-wideband (UWB) communications system.

With reference now to FIG. 1, there is shown an exemplary ultra-wideband (UWB) wireless communications system. The UWB wireless communications system as displayed includes an UWB transmitter 105 and an UWB receiver 110. Note that while the UWB wireless communications system is illustrated with a single receiver, there can be and typically are more than one receiver in a single wireless communications system.

A majority of UWB communications systems use streams of short duration pulses to encode and transmit data, although in the strictest sense, any wireless communications system is classified as an UWB communications system if the bandwidth of the signal being transmitted, $f_B$, is greater than or equal to 0.20 $f_c$, where $f_c$ is the center frequency of the signal being transmitted. Additionally, the UWB communications system should have a minimum bandwidth of 500 MHz. Therefore, other data encoding and transmission methodologies can be employed by UWB communications systems.

Figure 2A:
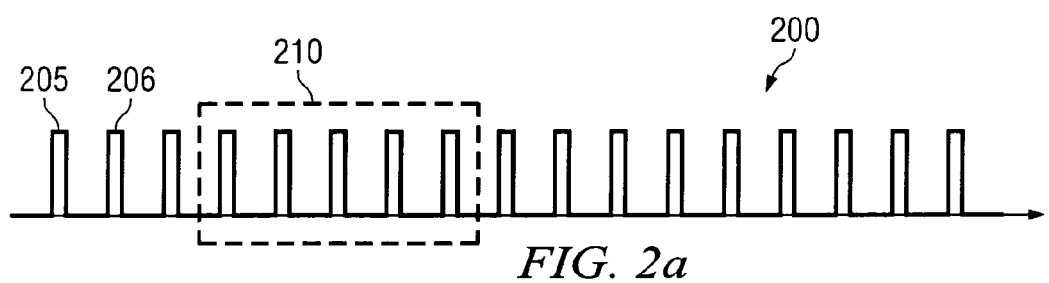
FIGS. 2a–2d are diagrams illustrating an exemplary stream of short duration pulses and several modulation schemes for the streams.

With reference now to FIG. 2a, there is shown an exemplary pulse stream 200, wherein the pulses are of short duration. The exemplary pulse stream 200 may be an output of an UWB transmitter which is part of an UWB communications system. The exemplary pulse stream 200 is made up of a series of short duration pulses, for example, pulses 205 and 206. Prior to being modulated, the pulses 205 and 206 are essentially identical (or as close to being identical as possible). A group of pulses 210 is highlighted to illustrate several commonly used modulation techniques. Note that although the pulses, for example, pulses 205 and 206, are illustrated as being essentially square in shape, in practice, pulses of a variety of different shapes, for example, Gaussian pulses, may actually be preferred over the square pulses due to difficulties in generating square pulses.

Figure 2B:
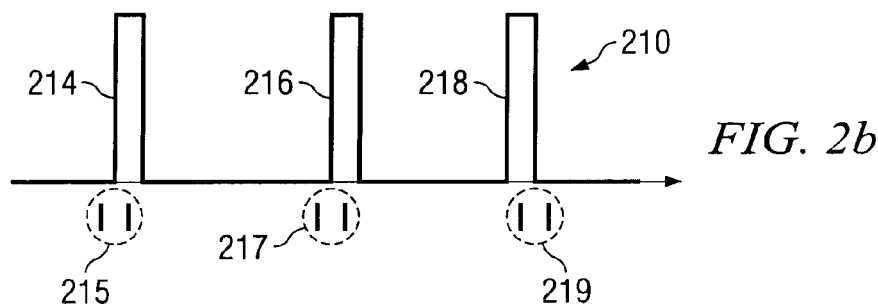

With reference now to FIG. 2b, there is shown the group of pulses 210, wherein the pulses are modulated using pulse position modulation (PPM). PPM varies the position of the pulses in order to encode the data. For example, three pulses 214, 216, and 218 can be used to illustrate PPM. The first pulse 214 is slightly delayed and appears a small amount of time after it was expected to appear, as indicated by highlight 215. The second pulse 216 is also slightly delayed and appears a small amount of time after it was expected to appear, as shown by highlight 217. Finally, the third pulse 218 is slightly advanced and appears a small amount of time prior to when it was expected to appear, as shown by highlight 217. PPM uses either the advanced or delayed appearance of a pulse with respect to its expected appearance to convey data.

Figure 2C:
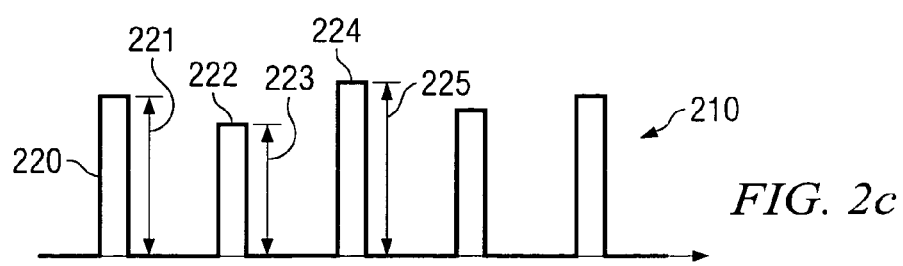

With reference now to FIG. 2c, there is shown the group of pulses 210, wherein the pulses are modulated using pulse amplitude modulation (PAM). PAM varies the amplitudes of the pulses to encode the data while leaving the positions of the pulses untouched. For example, pulses 220, 222, and 224 all vary in amplitude from one another, as indicated by markers 221, 223, and 225.

Figure 2D:
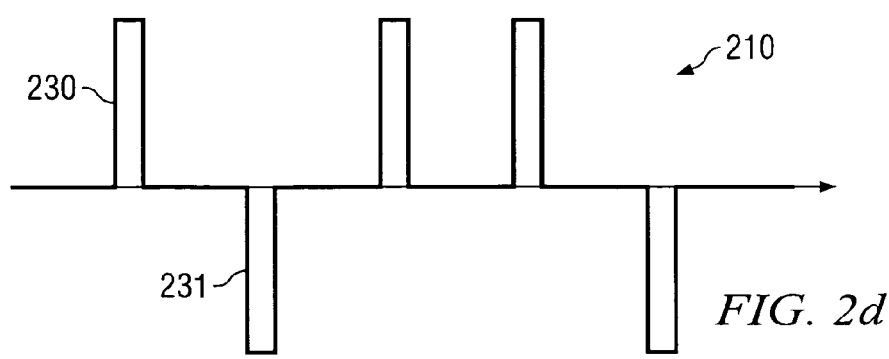

With reference now to FIG. 2d, there is shown the group of pulses 210, wherein the pulses are modulated using bi-phase modulation. FIG. 2d illustrates a case where the phase is varied one of two ways, zero (0) degrees or 180 degrees. For example, a first pulse 230 is at zero degrees, while a second pulse 231 is at 180 degrees.

Figure 3:
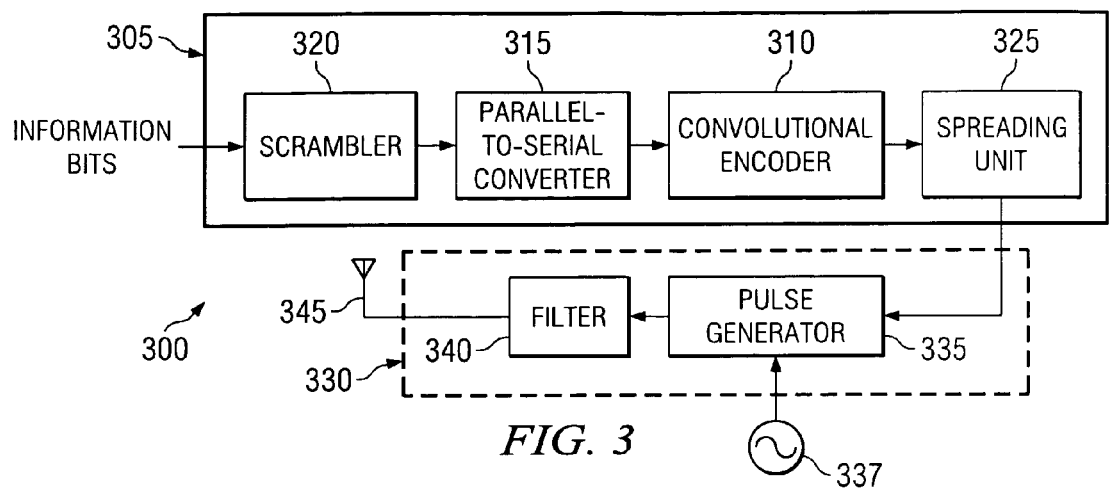
FIG. 3 is a block diagram showing a high-level block diagram of an UWB transmitter with a configurable pulse generator according to a preferred embodiment of the present invention.

With reference now to FIG. 3, there is shown a high-level block diagram of an UWB transmitter 300 with a configurable pulse generator 335 according to a preferred embodiment of the present invention. The UWB transmitter 300 is a fairly typical UWB transmitter in that it can be divided into two major portions, a digital portion 305 and an analog portion 330, plus an antenna 345.

The digital portion 305 is responsible for functions such as scrambling the serial data stream (for example, a scrambler 320), converting the encoded information stream in to a serial data stream (for example, a parallel-to-serial converter 315), encoding (for example, a convolutional encoder 310) a stream of information bits that is provided to the UWB transmitter 300 by some information generator, such as a digital device or a user, etc., and spreading the scrambled serial data stream (for example, a spreading unit 325). In other words, the digital portion 305 of the UWB transmitter 300 is responsible for converting the information bits into a form that is ready for transmission.

The analog portion 330 receives the spread and scrambled serial data stream from the digital portion 305 and then uses it to modulate the stream of short duration pulses. The analog portion 330 includes the configurable pulse generator 335, which is responsible for generating a generic pulse that is then modulated depending upon the value of a data bit (or chip) from the spread and scrambled serial data stream. The configurable pulse generator 335 has as input, a clock 337 (or an oscillator). After being modulated, the stream of short duration pulses is filtered by a filter unit 340. The filter unit 340 ensures that the transmission of the UWB transmitter 300 conforms to any physical and regulatory restrictions placed upon the output of the UWB transmitter 300.

Finally, the filtered stream of short duration pulses is provided to the antenna 345 where it is transmitted over-the-air. Due to the large bandwidth of the UWB transmitter 300, it is preferred that the antenna 345 be an ultra-wideband antenna, i.e., the antenna 345 has a bandwidth compatible with that of the bandwidth of the signal transmitted by the UWB transmitter 300.

With reference back to FIGS. 2a–2d, there are shown multiple streams of short duration pulses (for example, stream 200) that are made up of square pulses. Notice was given that the pulses were illustrated as square waves for the sake of easy illustration and that for certain applications, square waves are not the preferred pulse shape. For a significant number of different applications, a Gaussian pulse is a more preferred pulse shape. A Gaussian pulse, p(t), can be expressed mathematically as:

$$p(t) = Ke^{-\left(\frac{t}{T_s}\right)^2},$$

where K is a normalization factor and $T_s$ is the Gaussian pulse parameter. Gaussian pulses have certain advantages over other pulses, for example, the product of TIME and the bandwidth of a Gaussian pulse is a constant.

Figure 4:
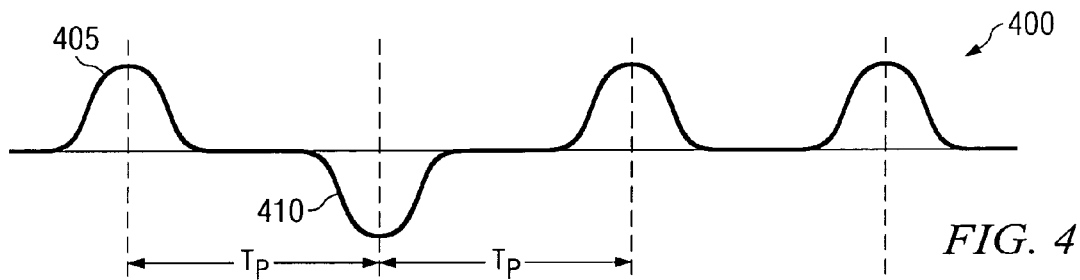
FIG. 4 is a diagram showing a stream of short duration pulses, wherein the short duration pulses are Gaussian pulses according to a preferred embodiment of the present invention.

With reference now to FIG. 4, there is shown a stream of short duration pulses 400, wherein the pulses are Gaussian pulses and the stream is modulated using bi-phase modulation according to a preferred embodiment of the present invention. When using bi-phase modulation, the polarity of the pulses is used to transmit the value of the data bit. For example, in the stream 400, three of the pulses (for example, pulse 405) have the same polarity, hence the three data bits represented by the pulses have the same value. A different pulse 410 has a reversed polarity, indicating that the data bit that it represents has a different value. Notice that the inter-pulse spacing, Tp, is constant for each pulse.

Of course, the Gaussian pulses displayed in FIG. 4 are analog pulses and in order to make use of the Gaussian pulses in a digital communications system, a digital representation of the Gaussian pulses needs to be developed. A typical way to create a digital representation of an analog signal is to sample the analog signal at regular intervals and quantize the value of the analog signal at each interval to produce a binary value. The smaller the sampling intervals and the larger the number of quantization levels, the more closely the digital representation resembles the analog signal. Unfortunately, if the sampling interval is very small or if there are too many quantization levels, then the amount of digital information generated to represent the analog signal is great, possibly more than the communications system is capable of handling. Therefore, there is a trade-off in the accuracy of the digital representation and the amount of digital information generated. Note that a digital representation of a signal later converted to a continuous-time signal is commonly referred to as a quantized signal, and that a "stair-step" characteristic obtained during the digitalization is maintained.

Figure 5A:
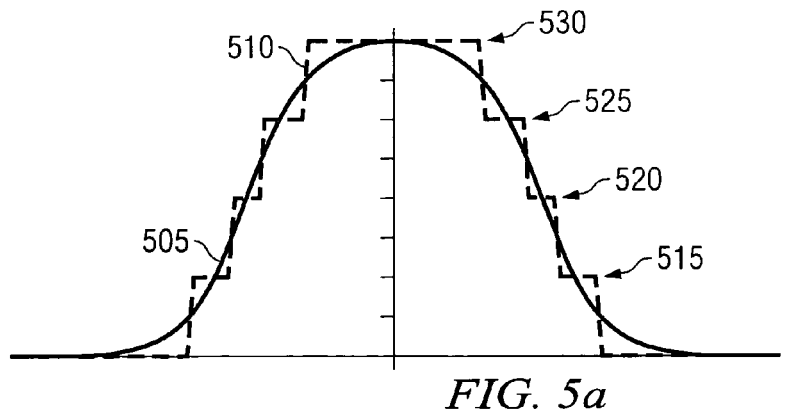
FIGS. 5a–5c are diagrams illustrating an analog Gaussian pulse with its quantized representation, a stream of short duration pulses with the quantized representation of the Gaussian pulses, and a frequency response plot comparing the analog Gaussian pulse and its quantized representation according to a preferred embodiment of the present invention.

With reference now to FIG. 5a, there is shown an illustration of an exemplary analog Gaussian pulse 505 and a quantized representation 510 of the exemplary Gaussian pulse 505 with a certain sampling interval and number of quantization levels. The exemplary Gaussian pulse 505 is displayed as a smooth heavy line while the quantized representation 510 is a stair-stepped dotted line. As illustrated in FIG. 5a, the quantized representation 510 of the exemplary Gaussian pulse 505 has four quantization levels. Note that in FIG. 5a, a zero signal level is not one of the four quantization levels, although in other implementations, it is common to consider the zero signal level to be a quantization level.

With four quantization levels, each quantization level of the quantized representation 510 can be represented by a two-bit binary value. For example, a quantization level pointed to by an arrow 515 can be represented by a binary value, "00", and a quantization level pointed to by an arrow 520 can be represented by a binary value, "01". Since, according to a preferred embodiment of the present invention, the zero signal value is not a quantization level, each of the available binary values can be used to represent a useful signal level. Therefore, a purely digital representation of the quantized representation may be "00 01 10 11 10 01 00", wherein each pair of binary values represents a single sample value at a single sampling point.

Bi-phase modulation uses both positive and negative polarity pulses, an additional bit is needed to denote the polarity of the pulse. Hence, if a two-bit binary value is used to represent a quantization level, then a three-bit binary value is used to represent that quantization level plus a polarity. For example, the quantization level pointed to by the arrow 520 can be represented with its polarity by a binary value, "001". Wherein the first "0" represents the polarity of the signal value, which happens to be positive in this example.

Figure 5B:
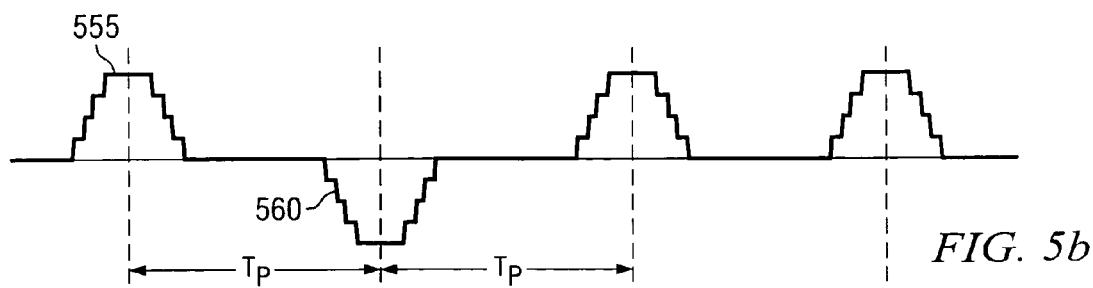

With reference now to FIG. 5b, there is shown a stream of short duration pulses, similar to what is shown in FIG. 4, wherein the pulses are quantized pulses, according to a preferred embodiment of the present invention. The stream of short duration pulses displayed in FIG. 5b can be representative of a quantized representation of the stream of short duration pulses 400 (FIG. 4), wherein a three-bit binary value is used to represent each sample of the pulse, with the zero signal level not quantized.

Figure 5C:
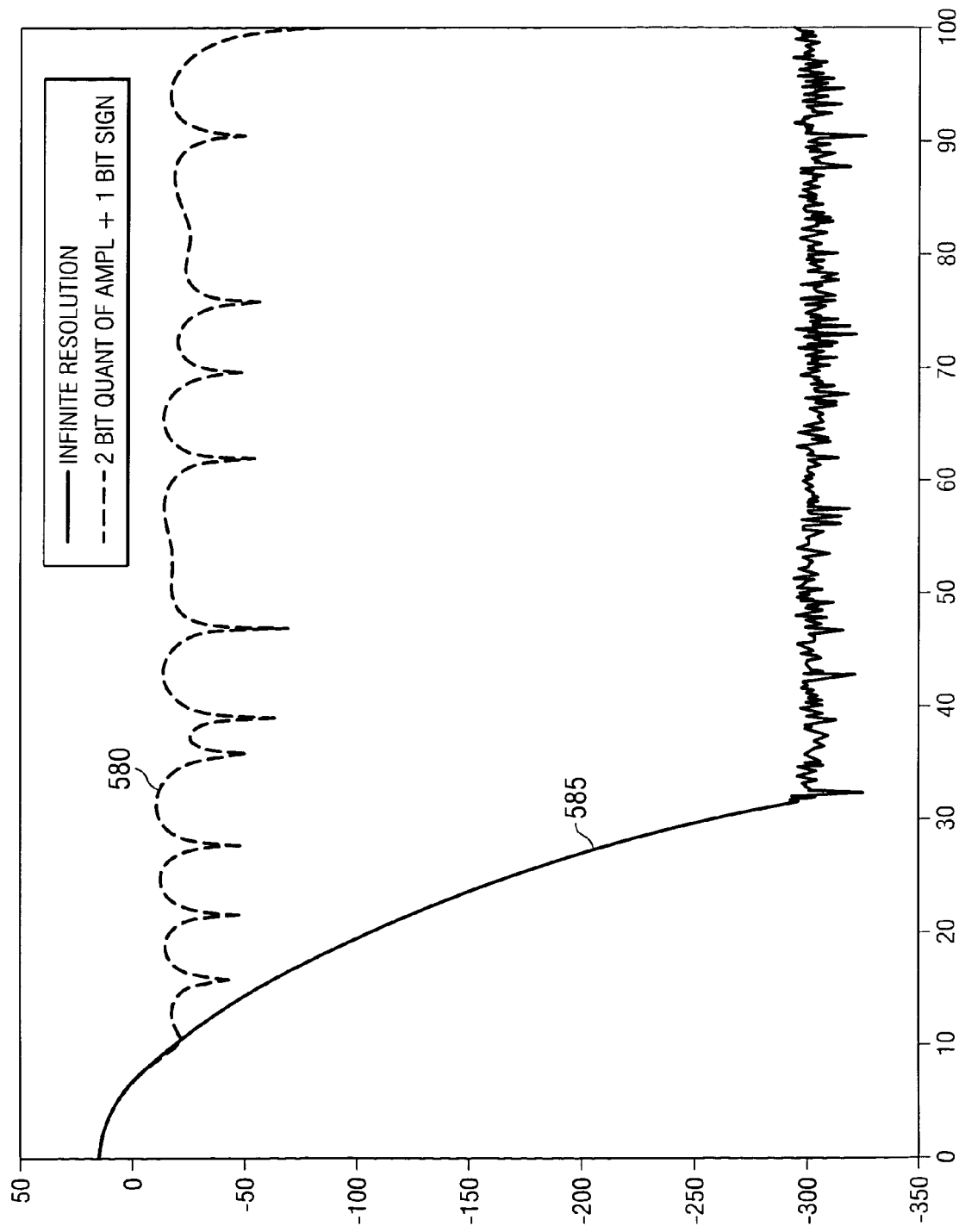

With reference now to FIG. 5c, there is shown a frequency response plot comparing the frequency response of an analog Gaussian pulse 585 (such as the Gaussian pulse 505 (FIG. 5a)) and a quantized representation 580 (such as the quantized representation 510 (FIG. 5a)) according-to a preferred embodiment of the present invention. Note that for approximately the first ten (10) GHz, the frequency response of the digital representation 580 and that of the analog Gaussian pulse 585 is essentially identical. Therefore, for digital communications systems with an overall bandwidth of 10 GHz or less, the quantized representation 580 is an adequate replacement for the analog Gaussian pulse. The behavior of the quantized representation 580 can be made to more accurately follow the analog Gaussian pulse 585 at higher frequencies (above 10 GHz) by more frequently sampling the analog Gaussian pulse and/or using more quantization levels.

As discussed above, the frequency response of the quantized representation 580 is very similar to the actual frequency response of the analog Gaussian pulse 585 when the frequencies are below approximately 10 GHz. Because the two frequency responses match quite closely, the quantized representation 580 can be substituted for the analog Gaussian pulse 585 in a communications system, as long as the frequencies do not exceed approximately 10 GHz. This can be achieved by using the quantized representation 580 in a communications system that does not place any signal information above 10 GHz. As an additional measure of insurance against information loss, a filter (either a low-pass or a band-pass filter) can be used to eliminate any frequency components of the quantized representation 580 above 10 GHz.

Should a quantized representation (such as the quantized representation 580, which is a signed four-level quantized representation) be needed to operate at higher frequencies, i.e., should the match between the analog signal and its quantized representation be needed for higher operating frequencies, then a higher level quantization and/or more samples can be used. For example, a signed eight- or 16-level quantization will result in a quantized representation that matches the actual analog pulse into the higher frequency ranges.

As discussed previously, there are many different methods that can be used to generate a quantized representation of an analog signal. For simple analog signals (such as square waves), a simple current source in conjunction with a resistor can be used to generate the quantized representation. For more complex analog signals, actual samples of the analog signals can be stored in a memory and the samples is then recalled from the memory and used to generate the quantized representation. The samples can be used to configure a current source or can be provided to a digital-to-analog converter (DAC) to provide a desired signal level. Unfortunately, these methods do not provide for a flexible way to generate a digital representation of an arbitrary analog signal or they would require the storage of a large number of samples, necessitating a large memory.

Figure 6A:
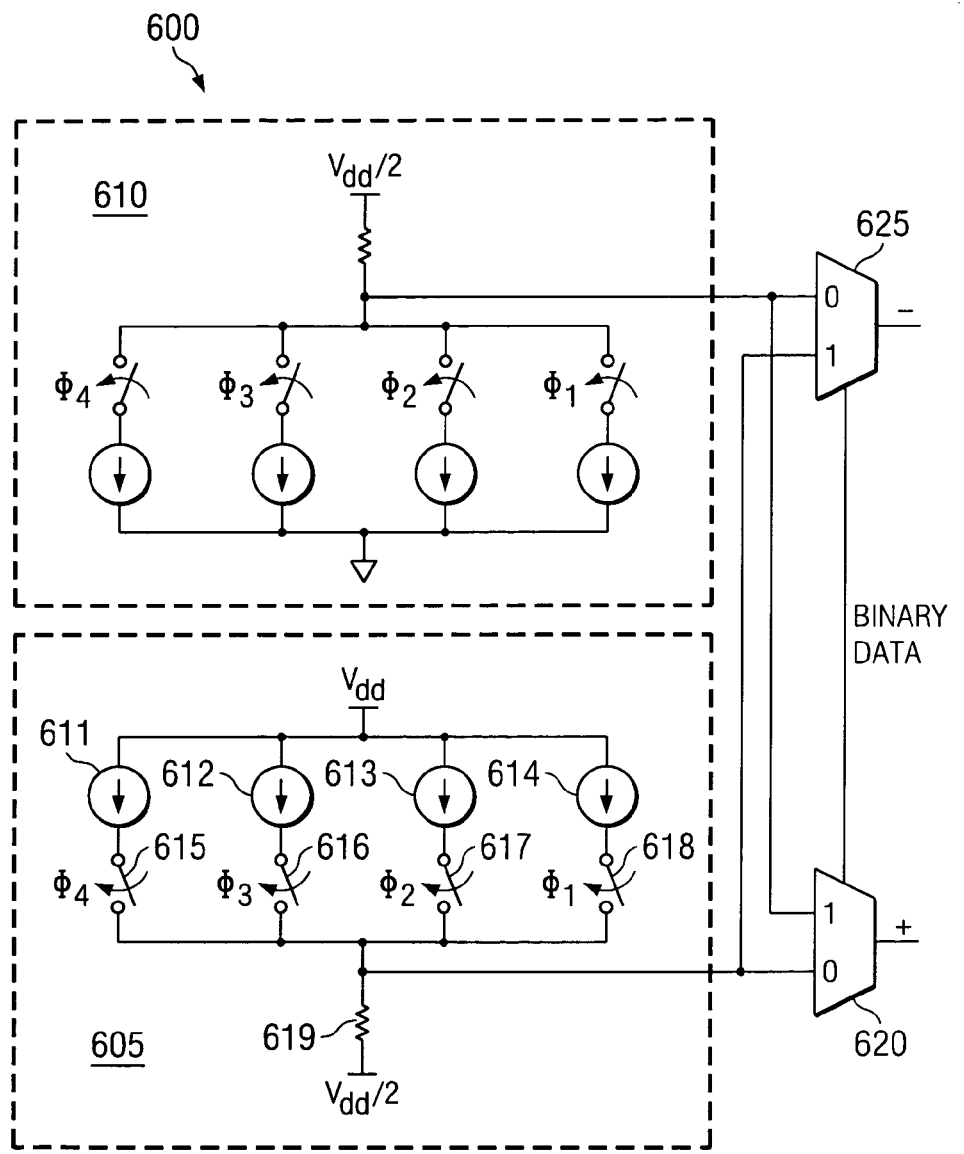
FIGS. 6a–6b are diagrams showing a quantized pulse generator, and a more complete circuit including that quantized pulse generator, respectively, used to generate a quantized representation of an analog signal, wherein the circuit produces a differential output, according to a preferred embodiment of the present invention.

With reference now to FIG. 6a, there is shown a circuit 600 to generate a quantized representation of an analog signal, wherein the circuit produces a differential output, according to a preferred embodiment of the present invention. Note that the circuit 600 can be modified to produce a single ended output by persons of ordinary skill in the art of the present invention without involving a significant amount of changes or effort.

As configured, the circuit 600 generates a quantized representation of a Gaussian pulse, such as displayed in FIG. 5a, using three quantization bits. The three-bits are allocated as follows: one bit to represent the polarity (sign) of the pulse and the remaining two bits represent one of four distinct quantization levels. The circuit 600 can be readily modified to support a different number of quantization bits. Additionally, note that the number quantization levels supported in the circuit 600 does not necessarily need to correspond directly to the number of bits. For example, while three bits (one polarity and two quantization bits) may be used, there may be only three different quantization levels for each of the two quantization level bits.

The circuit 600 features two main components, a first differential amplifier block 605 and a second differential amplifier block 610. The two differential amplifier blocks 605 and 610 are needed to produce a differential output signal. Notice that the two differential amplifier blocks 605 and 610 are essentially identical, with exception of the value of the power rails. Therefore, the discussion of a single differential amplifier block (for example, the first differential amplifier block 605) will sufficiently describe both differential amplifier blocks.

The first differential amplifier block 605 features four differential amplifiers 611, 612, 613, and 614. There are four differential amplifiers in the differential amplifier block 605 in order to provide four different signal levels needed for the three-bit quantized representation of the analog signal. Should a greater (or fewer) number of bits be used to represent the analog signal, then a different number of differential amplifiers would be present in the differential amplifier blocks. For example, should a four-bit quantization be desired, there would be $2^3$ (8) differential amplifiers (given that one of the four bits is used as the polarity bit). According to a preferred embodiment of the present invention, each of the four differential amplifiers is identical, producing essentially the same amount of current (or as closely equal as possible per the manufacturing method used to create the differential amplifiers). The use of identical currents in each of the differential amplifiers implement what is commonly referred to as thermometer scaling.

All four differential amplifiers are connected together at one end to a power rail, for example, Vdd. Each of the four differential amplifiers is also connected to a switch (for example, differential amplifier 611 is connected to a switch 615). Each of the four switches (615, 616, 617, and 618) is controlled by a control signal, φ. For example, switch 615 is controlled by control signal $\phi_4$, while switch 616 is controlled by control signal $\phi_3$, etc. The control signals selectively couple and decouple their respective differential amplifiers to a current path that includes a resistor 619. When the switch is closed by its respective control signal, current can flow from the differential amplifier through the resistor 619, producing a voltage drop across the resistor 619. If more than one switch is closed, then the combined current is dropped across the resistor 619, producing a larger voltage drop across the resistor.

The voltage drop across the resistor 619 and the corresponding voltage drop across a similar resistor (shown, but not labeled) in the second differential amplifier block 610 are provided to a pair of multiplexers 620 and 625. The multiplexers 620 and 625 are used to selectively couple the outputs of the two differential amplifier blocks 605 and 610 to the output of the circuit 600. The multiplexers 620 and 625 may be controlled by the binary data (for example, the first bit of the three-bit digital representation of the signal (the polarity bit)), which selectively selects one of two inputs of each of the two multiplexers 620 and 625 and produces them at the output of the circuit 600. Note that since the circuit 600 generates a differential output, the actual output signal is carried on two signal lines.

As displayed in FIG. 6a, if POLARITY was equal to "0", then the multiplexer 620 would select the output of the first differential amplifier block 605 for its output and the multiplexor 625 would select the output of the second differential amplifier block 610 for its output. If POLARITY was equal to "1", then multiplexer 620 would select the output of the second differential amplifier block 610 for its output and multiplexer 625 would select the output of the first differential amplifier block 605 for its output. The use of the multiplexers 620 and 625 and the POLARITY signal line, the polarity of the pulses can be rapidly and readily switched.

According to a preferred embodiment of the present invention, each differential amplifier block 605 and 610 present in the circuit 600 can have more differential amplifiers and switches than displayed. For example, each differential amplifier block 605 and 610 may feature eight (8), 16 or an arbitrary number differential amplifier and switch combinations. With such a large number of differential amplifier and switch combinations, the differential amplifier blocks 605 and 610 can adjust the resolution of the quantized pulse that is generated. Continuing with the above example, if a four-level quantized pulse (3-bits with one bit representing the polarity) does not provide sufficient resolution, then an eight-level quantized pulse (4-bits) or 16-level quantized pulse (5-bits) can be generated.

It is often desired to generate a zero signal level using the circuit 600, for example, when there is no pulse being generated. To generate a zero signal level using the circuit 600, simply open each of the switches (for example switches 615, 616, and so on in both the first and second differential amplifier blocks 605 and 610).

Figure 6B:
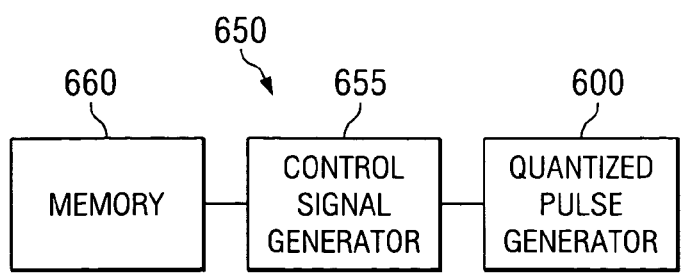

With reference now to FIG. 6b, there is shown a block diagram of a pulse generator 650 according to a preferred embodiment of the present invention. The circuit 600 illustrated in FIG. 6a is an embodiment of the actual circuit that generates the quantized pulses. However, certain other needed circuits were omitted, such as a circuit to generate a control signal generator.

The pulse generator 650 includes a quantized pulse generator, such as the quantized pulse generator 600 (FIG. 6a), a control signal generator, such as a control signal generator 655, and a memory 660. The control signal generator 655 uses information that specifies the pulse that the pulse generator 650 is to generate, and from that information, the control signal generator 655 creates a sequence and order of control signals (φ's) that is used by the quantized pulse generator 600 to create the quantized signal. An example of the information that is used by the control signal generator 655 is timing information that describes which control signals should be active and when and for how long it should remain active. The information (e.g., the timing information) for the control signals (φ's) can be stored for the in the memory 660.

Then upon system initialization, power-up, reset, or whenever a different pulse is to be generated, the information can be recalled from the memory 660 and used to generate the control signals. Note that by using the control signals to generate the quantized pulse, the various properties of the pulse, such as duration, period, etc., can be readily varied. For example, to generate a quantized representation of the pulse with a shorter duration, the time of the control signals are active can be reduced. To generate a quantized pulse with a longer period, the time in between the active periods of the control signals can be increased. The magnitude can also be varied by adding or eliminating additional control signals. This alleviates the need to store information or samples for variations of the pulse and saves on the amount of memory consumed in the memory 660 required to store the timing information.

According to a preferred embodiment of the present invention, information that can be used to generate a wide variety quantized pulses can be stored in the memory 660. Then, depending upon the desired quantized pulse, an appropriate set of information can be retrieved from the memory 660, modified to match the desired properties of the pulse, and then used to generate control signals (φ's).

Figure 7A:
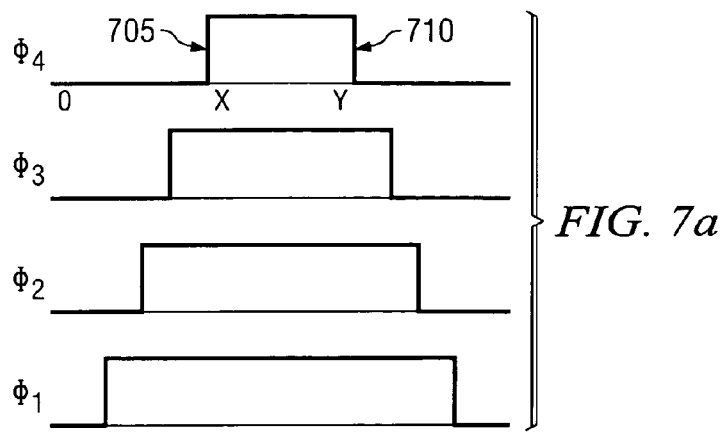
FIGS. 7a and 7b are diagrams showing a sequence of control signals used to control the circuit displayed in FIG. 6 to produce a quantized representation of a Gaussian pulse and a comparison between the analog Gaussian pulse and its quantized representation, according to a preferred embodiment of the present invention.

With reference now to FIG. 7a, there is shown an illustration of the control signals (φ's) used to control the switches (for example switches 615, 616, 617, and 618) in a differential amplifier block (for example, blocks 605 and 610) of a circuit (for example, circuit 600) used to generate a quantized representation of an analog signal, according to a preferred embodiment of the present invention. As displayed, the control signals are active high, meaning that the switches to which they are coupled are closed when the control signal is high. The $\phi_1$ control signal turns on first, followed by the $\phi_2$ control signal. Note that the $\phi_1$ control signal remains on while the $\phi_2$ control signal is turned on and that the $\phi_1$ control signal is the last control signal to turn off, such that the $\phi_2$ control signal overlaps in time with the $\phi_1$ control signal. Similarly, it can be seen that the $\phi_3$ and $\phi_4$ control signals also overlap in time with the $\phi_1$ control signal. Note also that as shown, each quantized value is a two-bit value (plus one additional bit for the polarity).

As an example, taking a-closer look at $\phi_4$ control signal, it is evident that the $\phi_4$ control signal can be specified by a rising edge 705 and a falling edge 710. Therefore, the information that may be stored to describe the $\phi_4$ control signal would be a time that corresponds to the rising edge 705 and a time that corresponds to the falling edge 710. Alternatively, rather than storing a time for the rising edge 705 and the falling edge 710, spatial information may be saved. Assuming that a zero (0) represents the beginning of a period of the $\phi_4$ control signal, then the rising edge 705 can be located at a certain location X and the falling edge can located at a certain location Y. The other control signals can be represented in a similar fashion.

Figure 7B:
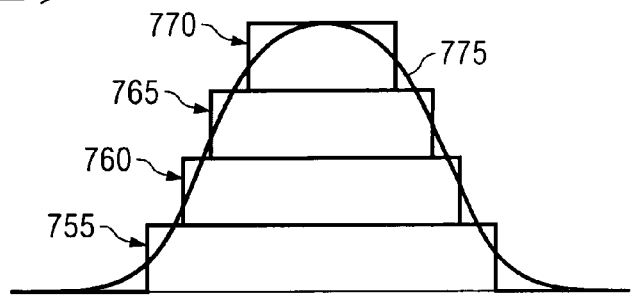
Figure 7C:
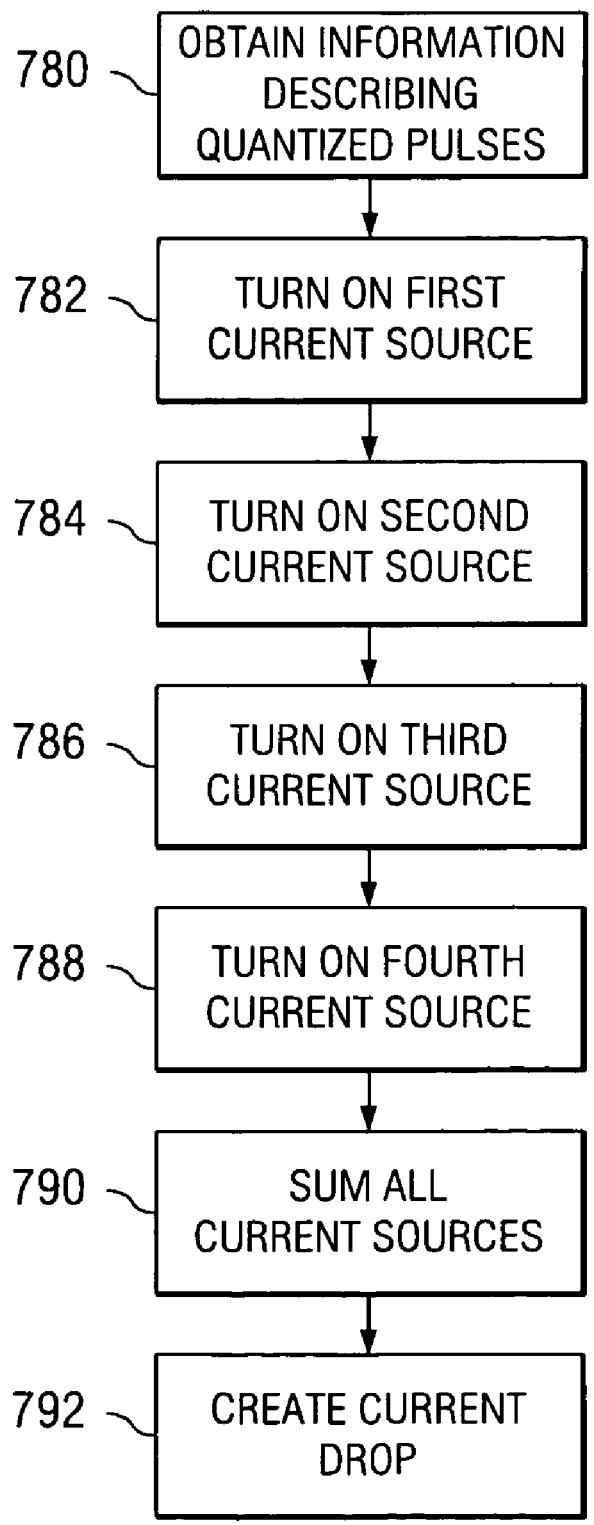
FIG. 7c shows a flowchart for generating the quantized pulses according to an aspect of the invention.

Thus, in the method for generating the quantized pulses, with reference now to the flow chart of FIG. 7c, information is obtained, for example from memory 660 (FIG. 6b) by the control signal generator 655 that describes the quantized pulses 780. Then, the first current source, for example current source 614 (FIG. 6a), is turned on at a first time and for a first duration (see $\phi_1$ in FIG. 7a) based on the information to produce a first current 782. The second current source, for example current source 613 (FIG. 6a), is turned on at a second time and for a second duration (see $\phi_2$ in FIG. 7a) based on the information to produce a second current 784. This may continue for as many current source contributions are desired. Thus, continuing with the embodiments shown in FIG. 6a, the next step in the flow chart of FIG. 7c is turning on the third current source 786 and turning on the fourth current source 788. Note that the current sources overlap in time, as shown in FIG. 7a. The current sources are summed 790, and a current drop is created from the summed currents 792, for example by directing the summed current through a resistor, as explained above in connection with FIG. 6a.

With reference now to FIG. 7b, there is shown a comparison of an analog Gaussian pulse 775 with a quantized representation of same, such as one produced by the circuit 600 (FIG. 6), according to a preferred embodiment of the present invention. A series of rectangular blocks 755, 760, 765, and 770 represent the outputs of the circuit 600 as each of the differential amplifiers are turned on by their respective control signals. Since the currents produced by the differential amplifiers additively combine, the voltage associated with the currents increase as more differential amplifiers are turned on.

Each of the differential amplifiers used in the circuit 600 (FIG. 6) are essentially identical to each other, within manufacturing tolerances. Therefore, the current produced by the differential amplifiers are also essentially equal. However, according to a preferred embodiment of the present invention, the current produced by the different differential amplifiers can be different. In fact, the use of different currents can make it simpler to reproduce certain pulses.

Figures 8A, 8B, 8C:
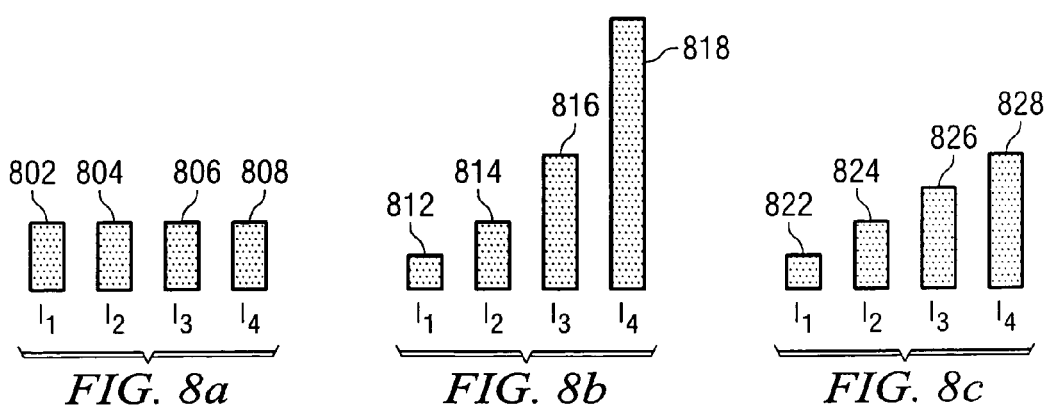
FIGS. 8a–8c are diagrams showing different weighing schemes for configuring a current produced by the various control signals, which are used to produce a quantized representation of an analog signal, according to a preferred embodiment of the present invention.

With reference now to FIG. 8a, there is shown a graph illustrating the currents produced by several differential amplifiers, wherein each of the differential amplifiers produce essentially the same amount of current, according to a preferred embodiment of the present invention. When each of the currents produced by the individual differential amplifiers are the same, then all of the differential amplifiers' outputs have the same weight. This is commonly referred to as thermometer scaling.

With reference now to FIG. 8b, there is shown a graph illustrating the currents produced by several differential amplifiers, wherein each of the differential amplifiers produces a different current, according to a preferred embodiment of the present invention. When this is the case, then the outputs of the various differential amplifiers have different weights, with the one producing greater currents having greater weight. For example, if a first differential amplifier were to produce a certain amount of current, $X(2^0*X)$, and if a second differential amplifier produces a different amount of current, $2X(2^2*X)$, and if a third differential amplifier produces yet another different amount of current, $4X(2^2*X)$, then the scaling would be referred to as binary scaling. Note that the binary (or power of two) scaling illustrated above is presented as an example and that other bases can be used, such as three, four, etc.

With reference now to FIG. 8c, there is shown a graph illustrating the currents produced by several differential amplifiers, wherein each of the differential amplifiers produces a different current, according to a preferred embodiment of the present invention. While FIG. 8b illustrates a geometric change in the currents produced by the differential amplifiers, FIG. 8c illustrates a linear change in the currents produced by the differential amplifiers. One possible reason for the use of linear change over geometric change is that there may be better matching between currents produced when using linear change than when using geometric change. Nor may it be possible to create simple differential amplifiers that accurately match the desired currents for the entire range. For example, if the current produced by a first differential amplifier had a value of Y, then the current produced by a second differential amplifier may have a value of 2*Y, and then the current produced by a third differential amplifier may have a value of 3*Y. Note that the linear relationship illustrated in FIG. 8c is simply an example of one possible linear relationship and that other linear relationships are possible.

Figure 9A:
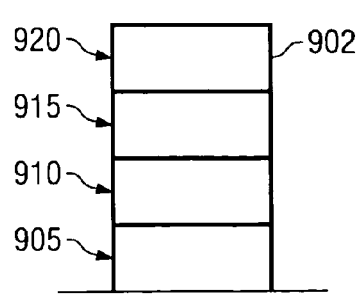
FIGS. 9a and 9b are diagrams showing several other possible analog signal waveforms and the sequence of control signals that can be used to generate a quantized representation of the analog signal waveforms, according to a preferred embodiment of the present invention.
Figure 9B:
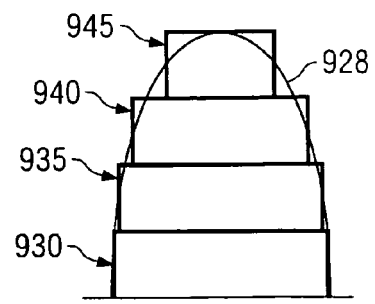

With reference now to FIGS. 9a and 9b, there are shown graphs illustrating two analog pulses and a series of control signals ($\phi$'s) used to create a quantized representation of the analog pulses according to a preferred embodiment of the present invention. Note that as displayed in FIGS. 9a and 9b, the quantization is a two-bit quantization (perhaps with an additional bit for polarity). FIG. 9a illustrates an analog square pulse 902 and a series of control signals (905, 910, 915, and 920) that are used to create the quantized representation of the analog square pulse 902 when used in conjunction with a circuit such as the circuit 600 (FIG. 6). Note that since the analog pulse is a square pulse, the quantized representation can come extremely close to matching the original pulse, therefore it is difficult to distinguish the analog square pulse 902 from the series of control signals (905, 910, 915, and 920) in FIG. 9a.

FIG. 9b illustrates an elliptically shaped analog pulse 928 and a series of control signals (930, 935, 940, and 945) that are used to create the quantized representation of the elliptical pulse 928. The quantized representation of the elliptical pulse 928 is not as close an approximation as the digital representation of the square pulse 902 (FIG. 9a), however, it should be close enough an approximation for communications systems with moderate bandwidths.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A method for generating quantized pulses comprising:
   obtaining information describing the quantized pulses;

turning on a first current source at a first time and for a first duration based on the information to produce a first current;

turning on a second current source at a second time different from the first time for a second duration based on the information to produce a second current overlapping in time with the first current;

summing the first and second currents; and creating a voltage drop based on the summed current.

2. The method of claim 1, wherein the information is obtained from a memory.

3. The method of claim 2, wherein the information are samples of the quantized pulses.

4. The method of claim 1 further comprising adjusting the information in order to conform to a set of desired characteristics for the quantized pulses.

5. The method of claim 4, wherein the information is timing data, and wherein the adjusting comprises shortening a duration that the first and second current sources are turned on.

6. The method of claim 4, wherein the information is timing data, and wherein the adjusting comprises increasing a duration that the first and second current sources are turned on.

7. The method of claim 1, wherein if the second current source is on, then the first current source is on.

8. The method of claim 7, wherein the first and second currents are equal in magnitude.

9. The method of claim 7, wherein the first and second currents are different in magnitude.

10. The method of claim 1 further comprising:

turning on a third and fourth current sources based on the information at third and fourth times, respectively, different from the first and second times for third and fourth durations, respectively, to produce third and fourth currents overlapping in time with the first current; and summing the third and fourth currents with the first and second currents.

11. The method of claim 1, wherein the voltage drop is created via a resistor.

12. The method of claim 1, wherein a negative quantized pulse is generated by reversing the voltage drop's polarity.

13. A quantized pulse generator comprising:

a plurality of differential amplifiers, each differential amplifier coupled at a first end to a power rail, the differential amplifier to produce a current;

a plurality of switches, each switch coupled to a second end of one differential amplifier of the plurality of differential amplifiers, the switch to regulate the flow of the current produced by the differential amplifier;

a resistor coupled to the second end of each of the differential amplifiers via the plurality of switches, the resistor to convert a current from each differential amplifier into a voltage drop when the switch is closed;

an output coupled to the resistor;

a control signal generator coupled to the plurality of switches, the control signal generator containing circuitry to generate a plurality of control signals, one control signal being coupled to each switch in the plurality of switches, wherein the control signals are used to open and close each switch; and a memory coupled to the control signal generator, the memory to store information regarding the plurality of control signals to be generated by the control signal generator.

14. The quantized pulse generator of claim 13, wherein each switch in the plurality of switches is controlled by an individual control signal.

15. The quantized pulse generator of claim 13, wherein each of the plurality of differential amplifiers produces a current of equivalent magnitude.

16. The quantized pulse generator of claim 13, wherein when a switch allows the current produced by a differential amplifier to flow, the current is then combined with other currents from other differential amplifiers so enabled by their respective switches.

17. The quantized pulse generator of claim 13, wherein the memory contains information used to specify a plurality of different quantized pulses.

18. The quantized pulse generator of claim 13 further comprising:

a second plurality of differential amplifiers, each differential amplifier coupled at a first end to a second power rail, the differential amplifier to produce a current;

a second plurality of switches, each switch coupled to a second end of one differential amplifier of the second plurality of differential amplifiers, the switch to regulate a flow of the current produced by the differential amplifier;

a second resistor coupled to the second end of each of the differential amplifiers in the second plurality of differential amplifiers via the second plurality of switches, the second resistor to convert a current from each differential amplifier into a voltage drop when the switch is closed; and a second output coupled to the second resistor.

19. The quantized pulse generator of claim 18, wherein the output of the quantized pulse generator is a differential signal and the voltage drop from the resistor is used as a positive component of the differential signal and the voltage drop from the second resistor is used as a negative component of the differential signal.

20. The quantized pulse generator of claim 18, wherein the output of the quantized pulse generator is a differential signal and the voltage drop from the resistor is used as a negative component of the differential signal and the voltage drop from the second resistor is used as a positive component of the differential signal.

21. The quantized pulse generator of claim 18, wherein an individual control signal controls one switch in the plurality of switches and one switch in the second plurality of switches.

22. The quantized pulse generator of claim 18, wherein the resistor effectively sums the currents allowed to flow in the plurality of differential amplifiers, and wherein the second resistor effectively sums the currents allowed to flow in the second plurality of differential amplifiers.

23. The quantized pulse generator of claim 18, wherein a number of differential amplifiers in the plurality of differential amplifiers is equal to a number of differential amplifiers in the second plurality of differential amplifiers.

24. The quantized pulse generator of claim 18 further comprising:

a first multiplexer having a first input coupled to the output and a second input coupled to the second output;

a second multiplexer having a first input coupled to the second output and a second input coupled to the output; and a control line coupled to both the first and second multiplexers, the control line dependent upon a polarity bit.

* * * * *